United States Patent [19]

Ball

[11] Patent Number: 4,916,781
[45] Date of Patent: Apr. 17, 1990

[54] FASTENING DEVICE

[76] Inventor: Arthur Ball, 12240 - 131 Street, Edmonton, Alberta, Canada, T5L 1M9

[21] Appl. No.: 241,583

[22] Filed: Sep. 8, 1988

[51] Int. Cl.$^4$ .............................................. F16B 12/22
[52] U.S. Cl. ...................................... 24/697; 24/618; 24/647; 403/381
[58] Field of Search ................ 24/697, 647, 616, 618; 403/381, 319, 355

[56] References Cited

U.S. PATENT DOCUMENTS

| | | | |
|---|---|---|---|
| 1,219,179 | 3/1917 | Smith | 24/697 |
| 1,436,858 | 11/1922 | Burhen | 403/381 |
| 2,320,776 | 6/1943 | Gorton | 403/381 |
| 2,422,693 | 6/1947 | McArthur | 24/223 |
| 2,449,167 | 9/1948 | Hopewell | 24/223 |
| 2,520,221 | 8/1950 | Ponty | 403/381 |
| 3,052,942 | 9/1962 | Mulvaney | 24/224 |
| 3,393,432 | 7/1968 | Jones | 24/224 |
| 3,406,433 | 10/1968 | Frey | 24/223 |
| 3,512,226 | 5/1976 | Carlile | 24/224 |
| 3,535,204 | 10/1970 | Truxa | 403/381 |
| 4,161,806 | 7/1979 | Hennisse et al. | 24/618 |

FOREIGN PATENT DOCUMENTS

| | | | |
|---|---|---|---|
| 444858 | 11/1947 | Canada . | |
| 502296 | 5/1954 | Canada . | |
| 727850 | 2/1966 | Canada | 24/40 |
| 809864 | 4/1969 | Canada | 24/57 |
| 830715 | 12/1969 | Canada | 24/57 |
| 1036326 | 8/1978 | Canada | 24/57 |
| 1039454 | 10/1978 | Canada | 4/48 |
| 461147 | 12/1913 | France | 24/697 |
| 1363479 | 5/1964 | France | 24/647 |
| 665054 | 1/1952 | United Kingdom | 403/381 |
| 1223120 | 2/1971 | United Kingdom | 24/647 |

Primary Examiner—Victor N. Sakran
Attorney, Agent, or Firm—Davis, Bujold & Streck

[57] ABSTRACT

A fastening device consisting of a first bar and a second bar. The first bar has an interior channel and a longitudinally extending groove communicating with the interior channel. The groove has enlarged openings at spaced intervals. The second bar has a plurality of tongues extending substantially perpendicularly and terminating with an enlarged appendage. The tongues are spaced at intervals corresponding to the interval spacing of the enlarged openings in the first bar. The appendages may be inserted through the openings into the channel and the tongues moved longitudinally along the groove to position the appendages out of register with the openings thereby coupling the second bar with the first bar.

5 Claims, 2 Drawing Sheets

FASTENING DEVICE

The present invention relates to a fastening device.

BACKGROUND OF THE INVENTION

There are a vast number of fastening devices commercially available. Most of these devices are not suitable where the object to which the fastening device is attached requires support along its length. For example, a truck box cover must extend the length of the box of a truck. If the cover is attached only at spaced intervals the force exerted upon the cover is uneven resulting in having of the material.

SUMMARY OF THE INVENTION

What is required is a fastening device which provides support along the length of the object it is securing.

According to the present invention there is provided a fastening device which is comprised of a first bar and a second bar. The first bar has an interior channel and a longitudinally extending groove communicating with the interior channel. The groove has enlarged openings at spaced intervals. The second bar has a plurality of tongues extending substantially perpendicularly and terminating with an enlarged appendage. The tongue are spaced at intervals corresponding to the interval spacing of the enlarged openings in the first bar. The appendages may be inserted through the openings into the channel and the tongues moved longitudinally along the groove to position the appendages out of register with the openings thereby coupling the second bar with the first bar.

Although beneficial results may be obtained with the described fastening device, even more beneficial results may be obtained if there is incorporated in the channel a form of release mechanism. This aspect of the invention is disclosed in the referred feature of having a shoe shaped guide with a sloped surface terminating with a toe positioned at one end of the channel in one of the enlarged openings. One of the appendages has a mating sloped surface terminating with a toe. The appendage is movable between a first position wherein the toe of the appendage engages the toe of the guide, and a second position wherein the sloped surface of the appendage engages the sloped surface of the guide. Upon movement of one of the bars the appendage engages the guide and is guided through the enlarged opening.

Although beneficial results may be obtained through use of the fastening device described, even more beneficial results may be obtained if means is provided to lock the fastening device. This is accomplished by the preferred feature of the invention of having means, such as a pin, extending through the bars to lock the first bar against longitudinal movement relative to the second bar.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
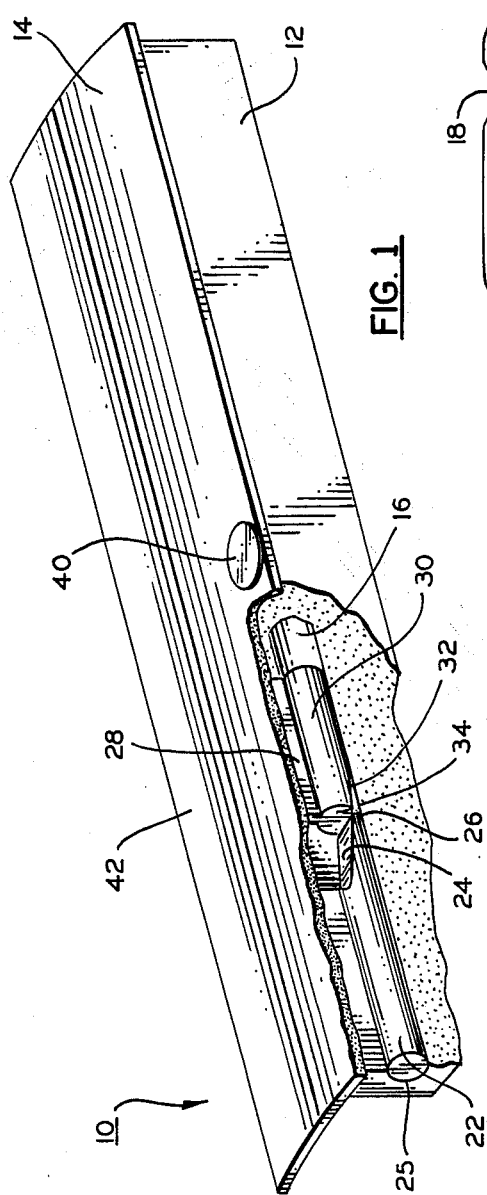
FIG. 1 is a partially cut away perspective view of a preferred embodiment of the invention.
Figure 4:
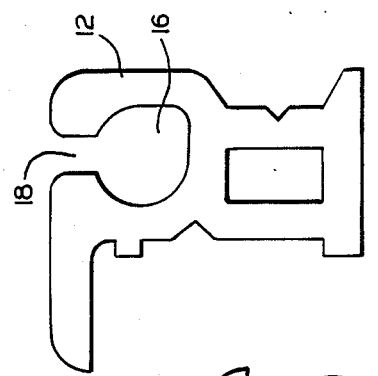
FIG. 4 is a section view of the fastening device taken along section lines 4—4 of FIG. 2.
Figure 3:
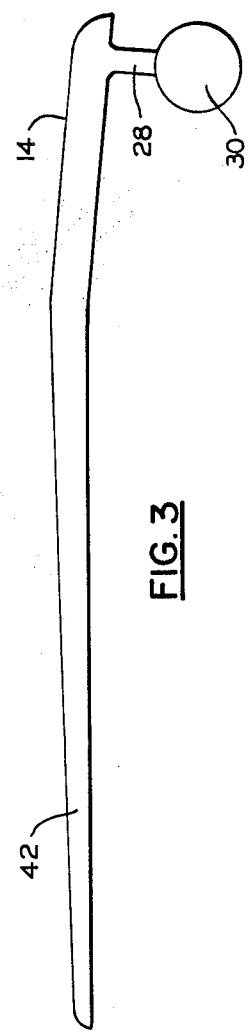
FIG. 3 is a section view of the fastening device taken along section lines 3—3 of FIG. 2.
Figure 2:
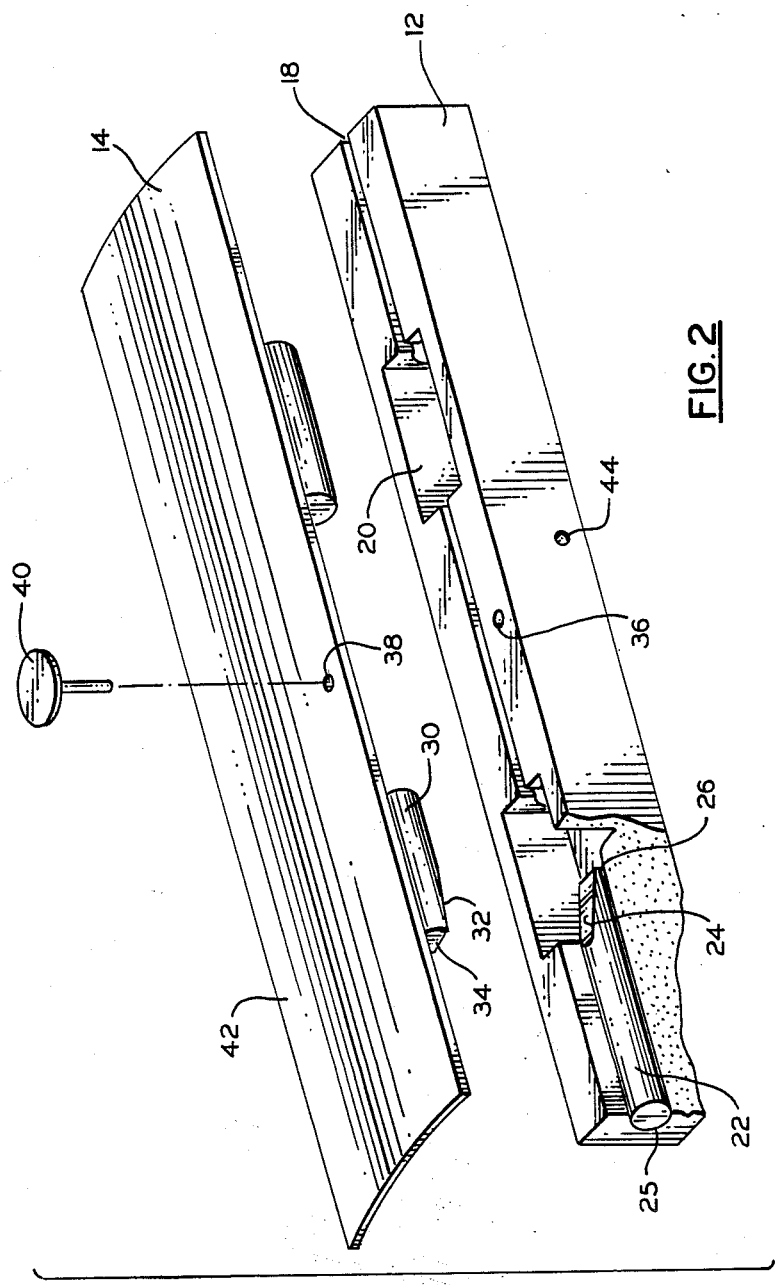
FIG. 2 is a partially cut away exploded perspective view of the fastening device illustrated in FIG. 1.

The preferred embodiment will now be described with reference to FIGS. 1 through 4. The preferred embodiment, generally designated by reference numeral 10, is a fastening device.

Fastening device 10 consists of a first bar 12 and a second bar 14. First bar 12 has an interior channel 16. A longitudinal groove 18 extends through first bar 12 into interior channel 16. Groove 18 has enlarged openings 20 at spaced intervals. A shoe shaped guide 22 is positioned at one end 25 of channel 16 aligned with one of enlarged openings 20. Guide 22 has a sloped surface 24 which terminates at its extremity in a toe 26.

Second bar 14 has a plurality of tongues 28 extending substantially perpendicularly. Each of tongues 28 terminate at their extremity in an enlarged bead like appendage 30. Tongues 28 are spaced at intervals corresponding to the interval spacing of enlarged openings 20 of first bar 12. One of appendages 30 have sloped surface 32 which mates with sloped surface 24 of guide 22. Sloped surface 32 terminates at its extremity in a toe 34. First bar 12 and second bar 14 have openings 36 and 38, respectively, through which a pin 40 extends. Second bar 14 has an extension 42. First bar 12 has transverse openings 44.

The use of fastening device 10 will now be described with reference to FIGS. 1 through 4. Fastening device 10 as illustrated has been adapted for use in securing a truck box cover to a truck box. The use of fastening device 10 will be described with respect to that particular application, however it will be apparent to one skilled in the art that use of the device is not so limited. For use in securing a truck box cover (not shown) second bar 14 was fabricated with extension 42. The purpose of extension 42 was to provide a surface onto which the cover material (not shown) to the truck box cover (not shown). Extension 42 also conformed to the side of the truck box (not shown) to provide a more aesthetically pleasing fit. Transverse openings 44 were drilled through first bar 12 to permit passage of screw fasteners which secured first bar 12 to the interior of the truck box (not shown). The coupling of first bar 12 with second bar 14 served to secure the truck box cover (not shown) to the truck box (not shown).

In order to couple first bar 12 with second bar 14 appendages 30 are inserted through openings 20 into channel 16. Tongues 28 are then moved longitudinally along groove 18 to position appendages 30 out of register with openings 20 so that appendages 30 are secured in channel 16 thereby coupling second bar 14 with first bar 12. As long as appendages 30 are out of register with openings 20 first bar 12 and second bar 14 will remain coupled as appendages 30 cannot pass through groove 18.

In order to further secure bar 12 with respect to bar 14, pin 40 is extended through openings 36 and 38. When pin 40 is inserted in openings 36 and 38 second bar 14 is locked against longitudinal movement relative to first bar 12. By enlarging the shaft portion of pin 40, pin 40 can be equipped with a key lock enabling a security feature not possibly with most other fastening devices.

Appendages 30 are engaged and disengaged with channel 16 by longitudinal movement relative to openings 20. These positions can be characterized as a first position and a second position. In the first position toe 34 of one of appendages 30 engages toe 26 of guide 22. This toe to toe engagement serves as a stop which prevents appendage 30 from moving longitudinally within channel 16. The engagement is superficial, and a small force exerted on second bar 14 will enable movement to a second position. In the second position sloped surface 32 of appendage 30 engages sloped surface 24 of guide 22. To remove the truck box cover (not shown), pin 40 is withdrawn from openings 36 and 38. A force is exerted to pull toe 34 passed toe 26 in order that bar 14 may move longitudinally relative to bar 12. As bar 14 is moved longitudinally appendage 30 moves in channel 16. This movement is assisted by guide 22. Upon relative longitudinal movement of one of bars 12 or 14 appendage is guided along sloped surface 24 of guide 22 to a position where it can be easily withdrawn through opening 20. In this particular application bar 12 is fixed to the truck box (not shown) so bar 14 must be moved. It is preferable that the one of appendages 30 which is selected to have a sloped surface 32 and toe 34 be at one of the ends of bar 14. The reason is that this makes it easier to exert a force to disengage toes 26 and 34. Once one of appendages 30 is aligned with one of openings 20, all of the appendages are aligned with all of openings 20 due to the relative spacing of the intervals between each of appendages 30 and each of openings 20.

It will be apparent to one skilled in the art that a variety of configurations are possible for appendage 30 and the invention is not limited to the shape illustrated. It will further be apparent to one skilled in the art that guide 22 is not a feature essential to the operability of the invention. It will finally be apparent to one skilled in the art that modifications may be made without departing from the teaching and scope of the invention.

The embodiments of the invention in which an exclusive property or privilege is claimed are defined as follows:

1. A fastening device, comprising:
   a. a first bar having a longitudinally extending interior channel and a longitudinally extending groove communicating with the interior channel, the groove having enlarged openings at spaced intervals; and
   b. a second bar having a plurality of tongues extending substantially perpendicularly and terminating with an enlarged appendage, the tongues being spaced at intervals corresponding to the interval spacing of the enlarged openings in the first bar thereby enabling the appendages to be inserted through the openings into the channel and enabling the tongues to be moved longitudinally along the groove to position the appendages out of register with the openings thereby coupling the second bar with the first bar.

2. A fastening device as defined in claim 1, having means extending through the bars to lock the first bar against longitudinal movement relative to the second bar.

3. A fastening device as defined in claim 1, having means to attach the first bar to a first object and the second bar to a second object thereby enabling the first and second objects to be detachably coupled to one another.

4. A fastening device comprising:
   a. a first bar having an interior channel and a longitudinally extending groove communicating with the interior channel, the groove having enlarged openings at spaced intervals;
   b. a second bar having a plurality of tongues extending substantially perpendicularly and terminating with an enlarged appendage, the tongues being spaced at intervals corresponding to the interval spacing of the enlarged openings in the first bar thereby enabling the appendages to be inserted through the openings into the channel and enabling the tongues to be moved longitudinally along the groove to position the appendages out of register with the openings thereby coupling the second bar with the first bar;
   c. a shoe shaped guide with a sloped surface terminating with toe positioned at one end of the channel in one of the enlarged openings; and
   d. one of the appendages having a mating sloped surface terminating with a toe, such that the appendage is movable between a first position wherein the toe of the appendage engages the toe of the guide, and a second position wherein the sloped surface of the appendage engages the sloped surface of the guide whereby upon movement of one of the bars the appendage is guided through the enlarged opening.

5. A fastening device, comprising:
   a. a first bar having an interior channel and a longitudinally extending groove communicating with the interior channel, the groove having enlarged openings at spaced intervals;
   b. a shoe shaped guide with a sloped surface terminating with a toe positioned at one end of the channel in one of the enlarged openings;
   c. a second bar having a plurality of tongues extending substantially perpendicularly and terminating with an enlarged appendage, the tongues being spaced at intervals corresponding to the interval spacing of the enlarged openings in the first bar, such that the appendages are insertable through the openings into the channel and the tongues are moveable longitudinally along the groove to position the appendages out of register with the openings thereby coupling the second bar with the first bar, one of the appendages having a mating sloped surface terminating with a toe, such that the appendage is longitudinally movable between a first position wherein the toe of the appendage engages the toe of the guide, and a second position wherein the sloped surface of the appendage engages the sloped surface or the guide whereby upon relative longitudinal movement of one of the bars the appendage is guided through the enlarged opening;
   d. a pin extending through openings in the bars to lock the first bar against longitudinal movement relative to the second bar;
   e. the first bar having an extension enabling material to be glued to the extension to secure the first bar to a first object; and
   f. the second bar having transverse openings enabling fasteners to be extended through the openings to secure the second bar to a second object thereby enabling a first and a second object to be detachably coupled to one another.

* * * * *